Aug. 4, 1970    W. V. SPURLIN    3,522,460

VIBRATOR

Filed Nov. 2, 1967    3 Sheets-Sheet 1

INVENTOR.
WILLIAM V. SPURLIN
BY
CAROTHERS & CAROTHERS
HIS ATTORNEYS

Aug. 4, 1970 W. V. SPURLIN 3,522,460
VIBRATOR
Filed Nov. 2, 1967 3 Sheets-Sheet 2
Fig.2
Fig.4
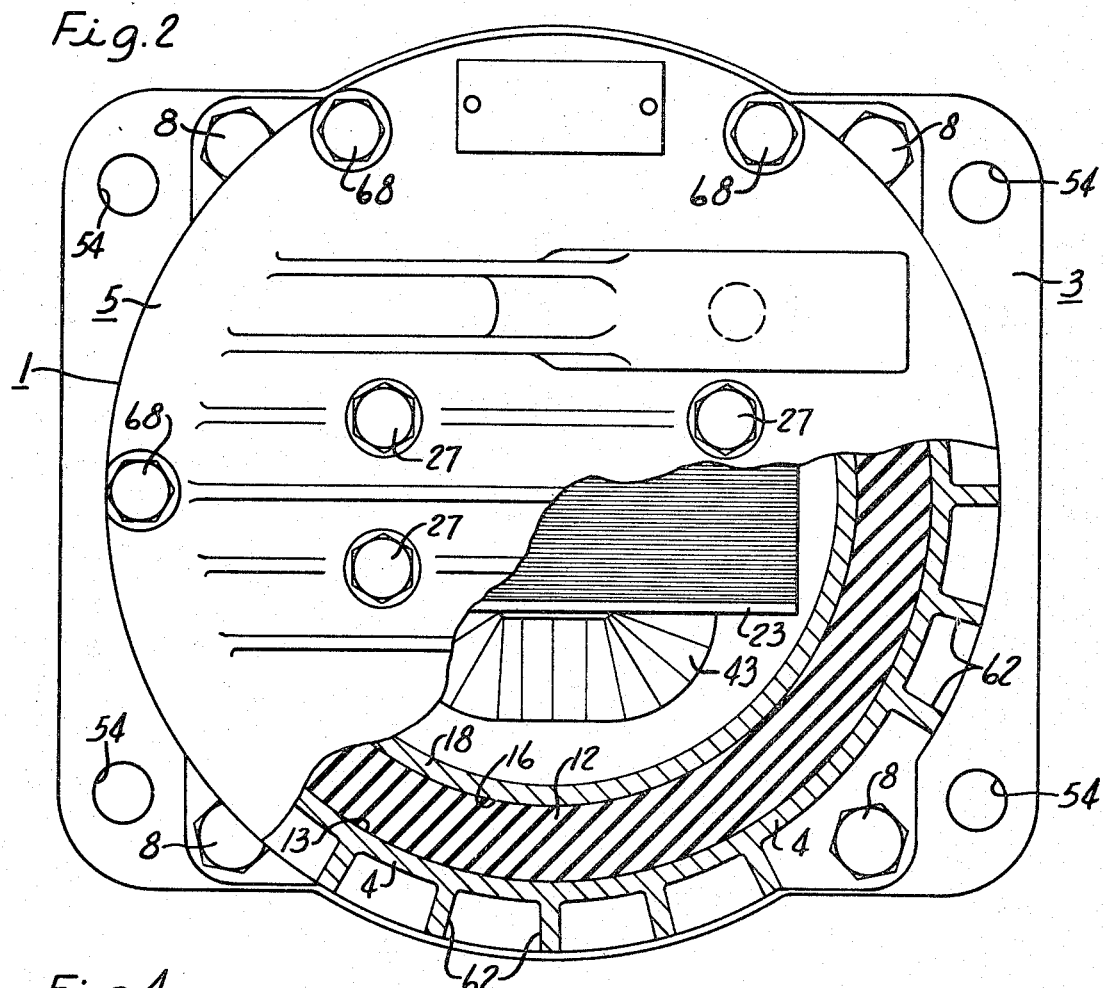
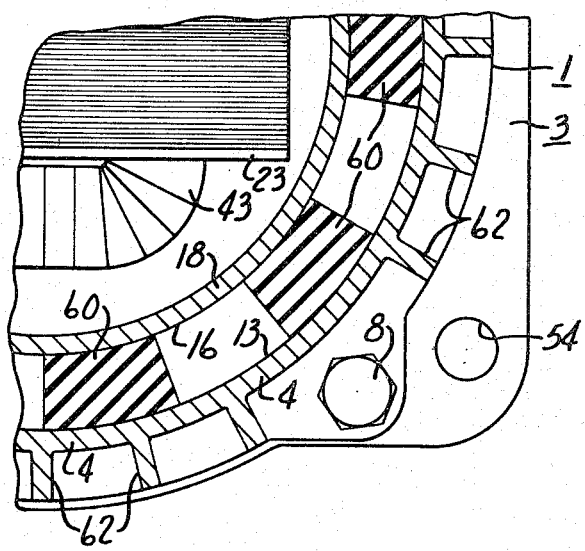
INVENTOR.
WILLIAM V. SPURLIN
BY
CAROTHERS & CAROTHERS
HIS ATTORNEYS Aug. 4, 1970 W. V. SPURLIN 3,522,460

VIBRATOR

Filed Nov. 2, 1967 3 Sheets-Sheet 3

INVENTOR.
WILLIAM V. SPURLIN
BY
CAROTHERS & CAROTHERS
HIS ATTORNEYS

United States Patent Office 3,522,460
Patented Aug. 4, 1970

3,522,460
VIBRATOR
William V. Spurlin, Indiana, Pa., assignor to FMC
Corporation, a corporation of Delaware
Filed Nov. 2, 1967, Ser. No. 680,117
Int. Cl. H02k 33/02
U.S. Cl. 310—29                                6 Claims

ABSTRACT OF THE DISCLOSURE

This invention is directed to a novel vibrator and the method of vibrating an object with a two mass vibratory spring system tuned in respect to the input frequency and to a vibrator wherein potential energy stored in the spring system is released when the exciter is de-energized allowing a striker on the moving mass to impact an anvil on the reaction base to provide a high output energy level relative to the input energy and providing an impact force adjustable through a range from zero to maximum.

CROSS REFERENCES

Weyandt, 2,310,185, Feb. 2, 1943, Cl. 172—240
Burt, 2,447,312, Aug. 17, 1948, Cl. 121—14
Burt, 2,472,568, June 7, 1949, Cl. 259—1
Alvord, 2,539,391, Jan. 30, 1951, Cl. 172—126
Spurlin, 3,167,670, Jan. 26, 1956, Cl. 310—29
Makino, 3,333,219, July 25, 1967, Cl. 335—252

BACKGROUND OF THE INVENTION

A vibrator, and particularly an impact vibrator, is for transmitting vibratory blows to the object to be vibrated without destruction of the vibrator or the object. The vibrators of the above prior art are electromagnetic and fluid actuated. The electromagnetic vibrators produce a vibration on the energization of the electromagnet; they do not induce a vibration upon the release of the magnetic force as in the present invention. The fluid actuated vibrators depend upon the exhaust of the fluid pressure from the expansion chamber and are limited in their ability to induce vibrations by the liquid, if employed, or by cushions or bumpers if pneumatic.

In both of these structures, one cannot effectively adjust, at the time of impact, the velocity of the moving mass to obtain the highest or a high level output enregy. Since the load energy is given by the formula $E = \frac{1}{2} mv^2$, it follows that a higher output energy level is obtainable at the highest velocity since the latter changes as the square of the velocity at the time of impact.

SUMMARY OF THE INVENTION

The vibrator of the present invention permits the velocity of the striking portion of the vibrator to be closely controlled and to uniformly and progressively vary in accordance with the energy input to the vibrator.

The natural frequency of the spring system is also another important factor having an effect on the output level of the vibrator of the present invention. For best stability and control the natural frequency of the two mass system should be 75% of the input frequency. For other applications the natural frequency should be between 50 and 85% of the input frequency. The lower free swing natural frequency of the vibrator system, i.e., at 50% of the input frequency, produces the highest output energy level. However, to obtain good linearity in the control, the natural frequency of this vibratory system must not be too low with respect to the input frequency. Thus the highest possible output is compromised to provide good output with linearity control.

The preload effect of the striker and the anvil surfaces upon the output forces produced is the third important factor of the present invention. Preload is defined as the amount of interference between the striker of the moving mass and the anvil or impact block on the reaction base. This amount of interference is equal to the distance that the spring system is deflected, i.e., the preload is defined as the distance that the face of the striker is offset from the plane it would occupy if the supporting springs were unstressed by the engagement of the striker and anvil.

When at rest, the striker may have an air gap of a few thousandths of an inch; or, preferably, the springs may be preloaded to provide no air gap when at rest. When the vibrator is energized, the preloaded condition of the springs is overcome to produce the striking gap.

Different materials on the striker and anvil surfaces provide different values of output for different preloaded conditions with the same natural frequency.

The preload also affects the linearity of control. The output of this vibrator provides better control linearity throughout the operating range with a preload such as .003″.

The character of the striker and anvil surface is also important. The effect is the same for the same materials when operating at the same values of natural frequencies and preload. The highest value of deceleration is obtained with steel. The maximum load deflection is obtained with a fiberglass reinforced plastic laminate. Obviously the time duration which the striker is in contact with the anvil would be very short with steel and at a high magnitude. A rubber surface would provide the longest duration at much lower magnitude even though the end result provides approximately the same total amount of energy transferred to the load. The fiberglass reinforced plastic laminate provides the maximum load deflection making an ideal intermediate. Although the amount of energy transferred to the load is substantially the same for each material, the load deflection will vary from material to material and the intended use of the vibrator must be considered.

BRIEF DESCRIPTION OF THE DRAWINGS

The accompanying drawings show for the purpose of exemplification, without limiting the invention or claims thereto, certain practical embodiments illustrating the principles of this invention wherein:

FIG. 2 is a top plan view with the parts broken away and shown in section.

FIG. 4 is a fragmentary view in a horizontal section showing a different character of spring.

DESCRIPTION OF THE PREFERRED EMBODIMENTS

Figure 1:
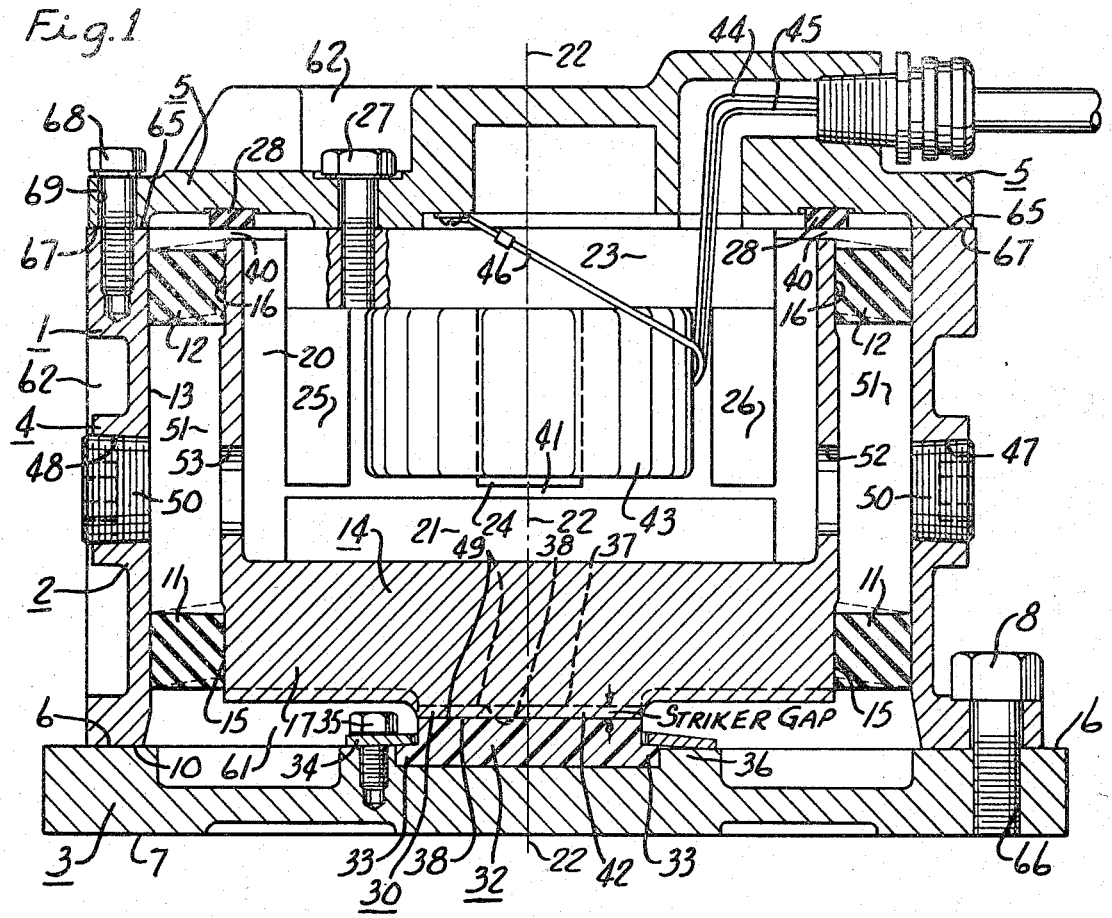
FIG. 1 is a view in vertical section showing the vibrator comprising this invention.

Referring to FIGS. 1 and 2, vibrator 1 comprises a housing 2, composed of a base 3 on which is secured an annular spring support 4 and a top or cover 5. Base 3 is preferably an iron or steel casting. The spring support 4 and the top or cover 5 are preferably constructed as aluminum castings.

The top and bottom surfaces 6 and 7 of the base 3 are finished respectively and receive the cylindrical spring support 4 which is secured to the base 3 by the bolts 8 passing through each of the four corners or ears as shown in FIG. 2. Thus the underside of perimetral surface 10 of the spring support 4 not only provides for a mating sealing surface with the annular surface 6 of the base 3 but also serves as a gauging surface for locating the striker surface and the moving mass upon fixing the lower and upper spring members 11 and 12 in the cylindrical bore 13 of the spring support. The springs 11 and 12 are in this instance an elastomer which may be bonded to the bore 13. The movable or moving mass 14 is in the form of a cylindrical member assimulating an upwardly opening bowl. The bore of each spring member 11 and 12 is cemented to the corresponding annular finished surfaces 15 and 16.

The moving mass 14 has a thick or heavy section 17 at the lower end thereof to provide additional weight for the moving mass. However, the annular wall 18 is relatively thin. The annular chamber 20 formed by the bowl is sufficiently large to receive the armature 21 extending across the bottom of the bowl and centered relative to the vertical central axis 22 of the vibrator. The core 23 is E-shaped providing a central pole piece 24 as one leg for the movement of flux in the opposite direction to the movement of flux in the outer legs 25 and 26, the pole faces of each providing an electrical air gap centered relative to the armature 21 and the vertical vibrator axis 22 as well as being equidistant from the face of the armature. The base of the E-shaped core 23 is secured to the underside of the cover 5 by means of the bolts 27.

The upper annular wall 18 of the moving mass 14 is arranged to engage the annular elastomer stop 28 which is vulcanized, cemented or otherwise secured to the underside of the cover 5. This stop 28 is materially wider than the upper edge of the annular wall 18 owing to the fact that the only guidance of the movement of the moving mass is the pair of the vertically aligned annular elastomer springs 11 and 12 which permit limited flexure and movement of the moving mass in any direction. However, the spaced pair of coaxially aligned springs 11 and 12 provide substantial axial movement of the moving mass along the axis 22. This is true regardless of the diameter of the springs so long as they are coaxially mounted.

The bottom or underside of the moving mass provides a striker 30 which is a circular extension depending from the underside of the cylindrical moving mass 14.

This striker 30 mates with the upwardly extending portion of the anvil 32 which is provided with an annular flange 33 encircling its bottom edge. The flange is engaged by the clamping washer 34 which is fastened to the base by the bolts 35 which are centered relative to the axial center 22. The upwardly extending portion 36 of the base 3 is bored out to receive the annular flange 33 of the anvil 32. As noted, the annular flange 33 of the anvil 32 extends above the top surface of the upwardly extending portion 36 on the base 3. As indicated by the dotted line 37, the under surface, including the actual striking surface 38, of the striker 30 is assumed to be raised as high as this dotted line flexing the annular spring 11 as indicated by the corresponding dotted line when the upper annular surface of the wall 18 of the moving mass 14 traverses the moving mass air gap 40 to engage and be arrested by the stop 28. At this time, the armature air gap 41 is partially but not completely closed, as it is the function of the stop 28 to prevent the armature 21 from engaging the pole pieces of the core 23. Thus, the upward stroke of the armature produces the gap formed between the surface of the striker 38 and the top 49 on the anvil 32 which is the gap 42 known as the striker gap of the vibrator. The springs 11 and 12 regardless of their preload are flexed by the attraction of the armature by the core upon energization of the exciter coil 43 supplied with energy impulses through the leads 44 and 45, one of which is grounded by the lead 46 to the other side of the cover 5 or the reaction base.

As soon as the energy impulse of the exciter ceases and the flux in the magnetic circuit decays, the springs 11 and 12 release the stored up energy due to their flexure and slam the striker surface 38 against the upper anvil surface 32. Since this striker gap 42 is initially zero, due to a preload, or only a few thousandths, the moving mass 14 is traveling at its highest velocity when the striker engages the anvil. If the striker gap 42 would be in the unenergized state of the vibrator, as much as a few hundredths or 1/10 of an inch, it is obvious that the springs 11 and 12 would reduce the velocity of the moving mass 14 at impact from the maximum velocity by flexing in the opposite direction and thus materially reduce the impact energy and load energy transmitted through the surface 7 of the base 3 to the object to be vibrated.

This vibrator is designed to be operated continuously at its rated capacity and at normal ambient temperatures. If it is operated at a materially higher ambient temperature, then it would be necessary to ventilate and cool the same to maintain the elastomer springs within their operating range. This is accomplished by using the cross-ventilation openings 47 and 48 in the cylindrical spring support member, which threaded openings are shown with their respective plugs 50 a conduit may be fastened to the openings for the purpose of blowing a cooling air into the chamber 51 and between the annular springs 11 and 12 of the purpose of cooling the wall 18 for the moving mass 14. If this is insufficient, opposed openings 52 and 53 may be formed in the cylindrical wall 18 of the moving mass 14 which permits the cooling air to flow across the chamber 51, through the port 52, along the air gap 41 between the pole faces of the core 23 and the armature 21, discharge through the port 53 flowing across the opposite side of the chamber 51, and discharge from the port 48 passing from the vibrator 1. This pneumatic cooling medium need not be air but may be a suitable gas that has superior qualities of conveying heat from within the operating vibrator.

The base 3 is made somewhat longer than the foot of the cylindrical spring support housing 4 (FIG. 2) and is provided with corners each of which has a bolt opening 54 passing therethrough. The openings are adapted to receive mounting bolts to secure the base 3 to the object to be vibrated.

Figure 3:
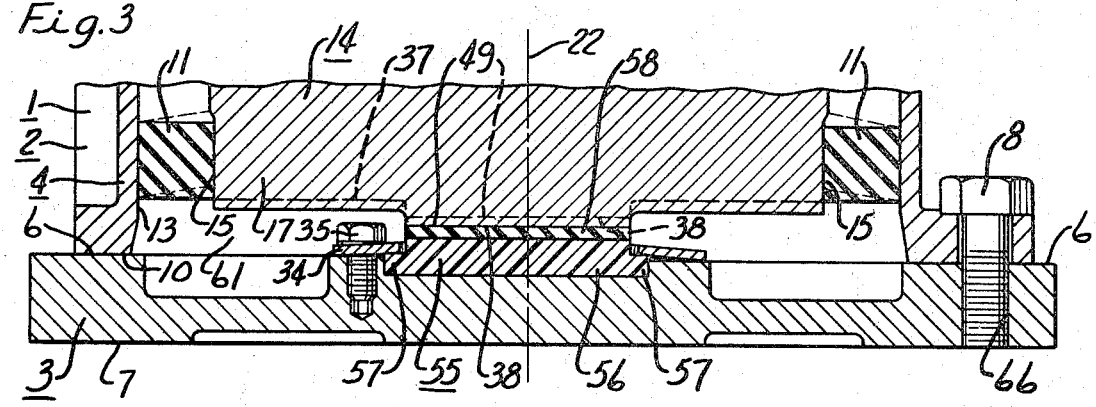
FIG. 3 is a fragmentary view in vertical section illustrating a different type anvil.

Referring to the partial sectional view in FIG. 3, the anvil 55 has substantially the same shape as the anvil 32 in FIG. 1. It is provided with a steel base 56 with an annular flange 57 extending under the clamp ring 34 and held by the bolts 35. An elastomer member 58 is vulcanized, cemented or otherwise secured to the upper or impact surface of the steel base 56. The elastomer 58 is engaged by the striker surface 38 under the preloaded condition of the springs 11 and 12 and is adapted to be struck by the striker surface during operation of the vibrator. The elastic qualities of the elastomer impact surface create a longer load delivery stroke for the moving mass 14. Thus the moving mass will not bounce back as readily where the fiberglass reinforced plastic laminate anvil 32 is employed or as readily as when the anvil is constructed of steel which makes the striker member rebound at a higher velocity.

Thus, whether the anvil is made of steel or a fiberglass reinforced plastic laminate or rubber will determine the type of the rebound of the moving mass 14 and thereby partially determine the operating characteristics of the vibrator.

Referring to FIG. 2, it will be noted that the annular springs such as indicated at 12 are complete circular rings with their outer surface secured to the inner cylindrical wall 13 of the spring support 4 and their inner surfaces secured to the outer perimetral surface 16 of the wall 18. As illustrated, these springs are substantially rectangular in cross section and are sized in accordance with the spring rate required to obtain the correct natural frequency of the system.

In FIG 4, the spring members 60 are a series of spring blocks of elastomer material which are spaced annularly about the vertical central axis 22 and which are secured to their respective opposite cylindrical walls 13, 15 and 16. One or both of the springs 11 or 12 may be constructed in this manner. Each or both may have a more or less number of the spring sections 60 to obtain the proper spring rate required for the correct natural frequency of the system.

Figure 5:
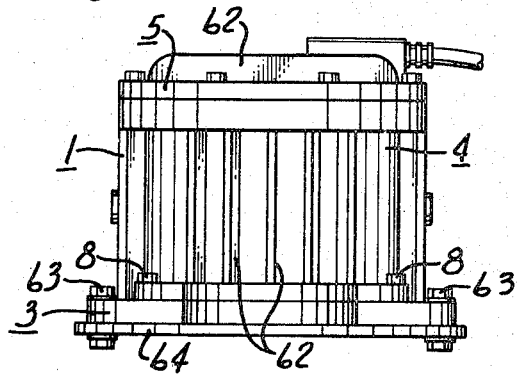
FIG. 5 is a view in elevation of the assembled vibrator.

As shown in FIG. 5, the base 3 may be secured by the bolts 63 to the object to be vibrated, as indicated at 64. The spring support 4 is closed at its upper end by the cap 5. The spring support 4 and the cap 5 show the use of ribs which not only strengthen these castings but provide heat radiation surfaces.

Figure 6:
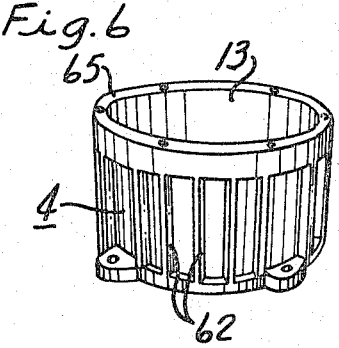
FIG. 6 is a perspective view of the body casting.

In FIG. 6, the perspective view of the cylindrical spring support 4 shows the ribs 62 together with the ears that receive the bolts 8 for assembling and clamping the spring support 4 to the surface 6 of the base 3. The upper finished surface 65 of the spring support 4 is indicated in FIG. 6, which receives the under annular surface of the cap 5.

Figure 7:
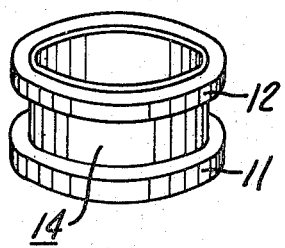
FIG. 7 is a perspective view of the moving mass.

In FIG. 7, there is shown the moving mass 14 with its wall 18 having secured thereto the annular spring members 11 and 12. A gauge block may be employed under the striker surface 38 to properly position the springs 11 and 12 in the bore of the spring support 4, thus insuring the proper location of the surface 30 relative to the impact surface 38 while cementing or otherwise securing the outer perimetral surface of the springs 11 and 12 to the bore 13 of the spring support 4.

Figure 8:
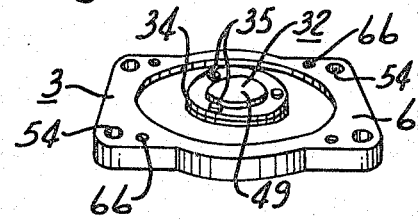
FIG. 8 is a perspective view of the base casting.

Referring to FIG. 8, it shows the base 3 with its anvil 32 held down by the ring 34 secured in place by the bolts 35 at its upper clamping surface 6. This view also shows the threaded openings 66 for receiving the bolts 8 as well as the through bolt holes 54 for receiving the bolts 63 for bolting the base 3 to the object to be vibrated, as illustrated at 64 in FIG. 5.

Figure 9:
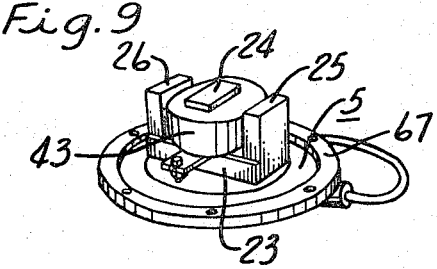
FIG. 9 is a perspective view of the underside of the cover casting with a core and exciting coil secured thereto.

FIG. 9 shows the underside of the cap 5 with the core 43 having its three legs 24, 25 and 26 extending upwardly to expose their pole faces, the center pole 24 containing the exciter coil 43. This view also shows the annular surface 67 on the underside of the cap 5 which is adapted to mate with the annular surface 65 on the top of the cylindrical spring support 4. It also shows the through holes 69 to receive the bolts 68.

FIGS. 6 to 9, inclusive, thus show the unassembled principal parts of the vibrator which is illustrated in assembled relation in FIG. 5.

Figure 10:
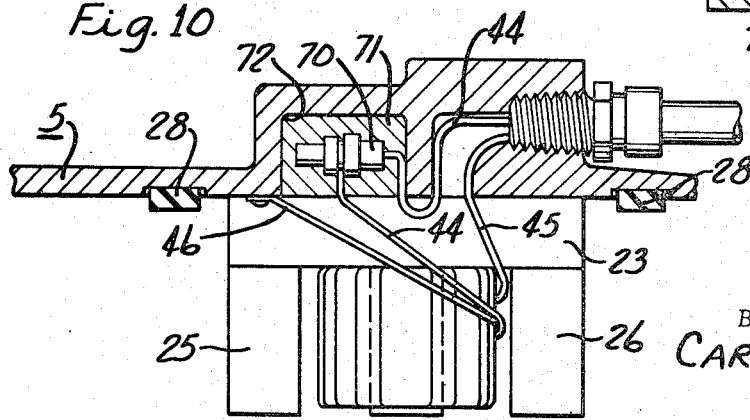
FIG. 10 is a view in section of the cover casting with the core and exciting coils secured thereto and provided with an incapsulated rectifier connected in series with the exciter coil.

Referring to FIG. 10, the cover 5 illustrates a solid state rectifier in the form of the diode 70 incapsulated by the material 71 within the chamber 72 of the undersurface lid and above the core member 23. As illustrated, the conductor 44 passes through the diode on its way to the exciter coil and the current returns through the conductor 45 to the other side of the alternating current supply. The conductor 46 is the conductor that grounds the electrical system.

Figure 11:
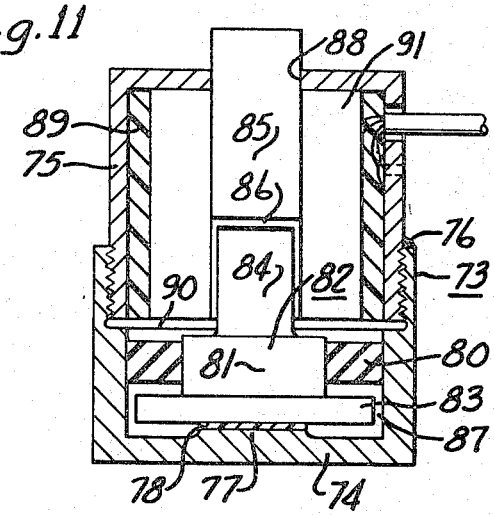
FIG. 11 is a view in section showing a modified form of the vibrator structure comprising this invention.

Referring now to FIG. 11, the vibrator 73 comprises a housing structure made in two sections, namely, the base housing structure 74 and the cover housing section 75, both of which are cylindrical cap members threaded so that they may be screwed together when the parts are assembled therein. Upon assembly, the housing sections are locked together by the tackweld 76.

The base housing 74 is provided with an axial anvil 77 which is faced with a material such as a fiberglass reinforced plastic laminate, as indicated at 78. This base housing 74 has bonded thereto the elastomer spring member 80 which is in the form of an annular elastic ring, the inner diameter of which is bonded to the intermediate diameter 81 of the movable mass 82 which also provides a striker member 83 at its lower end and an armature section 84 at its upper end. The armature 84 is spaced from the exciter core 85 to provide an air gap 86 therebetween. A second air gap 87 is annular and extends circumferentially of the striker 83.

The cover housing section 75 has secured thereto the exciter coil 91 the center of which receives the core 85 that has a tight sliding fit in the bore 88 of the housing 75 to permit the core 85 to be adjusted for changing the air gap 86. The exciter coil 91 is secured within the housing 75 by means of the plastic material indicated at 89 which retains the exciter coil annularly and within the walls and top of the cover housing section 75.

The fiberglass reinforced plastic laminate anvil facing 78 provides a greater gap than the annular gap 87 to the flow of magnetic energy between the magnetic circuit from the core 85 to the cover 75 and the base housing structure 74.

Although this vibrator has only one annular elastomer spring 80, the same may provide a gap of .003 thousandths between the striker 83 and the anvil surface 78 or the anvil may be engaged by the underside of the striker 83 with substantially no preload, or on the other hand the anvil may be engaged by the underside of the striker 83 under a preload condition. One of these three possible conditions of loading the armature and striker of the vibrator is determined by the positioning of the elastomer spring 80 before it is bonded to the contiguous base and armature annular surfaces.

If it is not desired to provide an adjustable air gap 86, the core 85 may be tackwelded to the cover 75 to prevent any axial movement of the former.

I claim:

1. An electromagnetic vibrator comprising a housing including a base portion, a tubular portion extending in upright relationship from said base portion, and a cover rigidly secured across the upper end of said tubular portion; an electromagnet rigidly attached to said cover and depending therefrom; a movable member having a tubular shape similar to that of the tubular portion of said housing but of a smaller diameter; elastomeric spring means secured to the inner wall of said tubular portion of the housing and to the outer wall of said movable member for resiliently mounting said movable member coaxially within said housing for limited axial movement, said spring means comprising a plurality of elastomeric members spaced axially within said housing and arranged circumferentially about said movable member; an armature rigidly attached to said movable member in a position to be attracted by said electromagnet so as to cause said movable member to be moved axially with respect to said housing; a striker at the lowermost end of said movable member; a striking surface on the uppermost face of said base portion of the housing positioned adjacent to said striker when said electromagnet is not energized; means for imparting vibrations to said housing by intermittently energizing said electromagnet at a predetermined exciting frequency and moving said striker upwardly away from said striking surface whereby said spring means is arranged to return said movable member to its lowermost position during the periodic interruptions in the energizations of said electromagnet to cause said striker to strike said striking surface, the size and characteristics of said spring means with respect to the mass of said movable member being chosen so that the free swinging natural frequency of vibration of said movable member is between 50% and 85% of said exciting frequency.

2. An electromagnetic vibrator as set forth in claim 1 wherein said tubular portion of said housing is provided with a radially extending ventilation opening located between said elastomeric members for directing cooling air to said movable member.

3. An electromagnetic vibrator as set forth in claim 2 wherein said movable member is provided with a radially extending ventilation opening located between said elastomeric members for directing cooling air to said electromagnet.

4. An electromagnetic vibrator as set forth in claim 1 wherein said natural frequency of vibration of said movable member is approximately 75% of said exciting frequency.

5. An electromagnetic vibrator as set forth in claim 1 wherein said spring means comprises a plurality of spaced elastomeric members arranged in an annulus about said movable member.

6. An electromagnetic vibrator as set forth in claim 1 wherein said spring means comprises a pair of axially spaced annular elastomeric members arranged about said movable member.

References Cited

UNITED STATES PATENTS

| | | | |
|---|---|---|---|
| 1,817,403 | 8/1931 | Weyandt | 310—29 |
| 3,312,841 | 4/1967 | Makino | 310—15 |
| 3,333,219 | 7/1967 | Makino | 335—252 |
| 2,726,342 | 12/1955 | Caretto | 310—30 |
| 3,053,965 | 9/1962 | Kintzel | 335—252 XR |
| 2,662,193 | 12/1953 | Weyandt | 318—125 XR |
| 2,669,447 | 2/1954 | O'Connor | 310—29 XR |
| 2,918,590 | 12/1959 | Gilbert | 310—29 |
| 3,404,299 | 10/1968 | MacBlane | 310—17 |
| 1,945,015 | 1/1934 | Warzbach et al. | 310—29 |
| 3,170,078 | 2/1965 | Kuschel | 310—29 |

FOREIGN PATENTS 870,992  4/1942  France.

MILTON O. HIRSHFIELD, Primary Examiner

B. A. REYNOLDS, Assistant Examiner

U.S. Cl. X.R.

318—125; 335—252

UNITED STATES PATENT OFFICE
CERTIFICATE OF CORRECTION

Patent No. 3,522,460     Dated August 4, 1970

Inventor(s) William V. Spurlin

It is certified that error appears in the above-identified patent and that said Letters Patent are hereby corrected as shown below:

Column 3, line 53, after "base" insert -- 3 --. Column 7, cancel all of the matter beginning with line 10 to and including line 13, same column 7; column 7, line 14, "6." should read -- 5. --. In the heading to the printed specification, line 7, "6 Claims" should read -- 5 Claims --.

Signed and sealed this 21st day of December 1971.

(SEAL)
Attest:

EDWARD M. FLETCHER, JR.
Attesting Officer

ROBERT GOTTSCHALK
Acting Commissioner of Patents